US011101672B2

(12) United States Patent
Shibata

(10) Patent No.: US 11,101,672 B2
(45) Date of Patent: Aug. 24, 2021

(54) SECONDARY BATTERY PROTECTION APPARATUS

(71) Applicant: Kohei Shibata, Tokyo (JP)

(72) Inventor: Kohei Shibata, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 17/016,469

(22) Filed: Sep. 10, 2020

(65) Prior Publication Data

US 2020/0412138 A1 Dec. 31, 2020

Related U.S. Application Data

(62) Division of application No. 15/091,716, filed on Apr. 6, 2016, now Pat. No. 10,811,888.

(30) Foreign Application Priority Data

Apr. 24, 2015 (JP) .............................. JP2015-089633

(51) Int. Cl.
*H02J 7/00* (2006.01)
(52) U.S. Cl.
CPC .......... *H02J 7/0029* (2013.01); *H02J 7/0013* (2013.01); *H02J 7/0026* (2013.01); *H02J 7/0036* (2013.01); *H02J 7/00302* (2020.01); *H02J 7/00304* (2020.01); *H02J 7/00306* (2020.01)
(58) Field of Classification Search
CPC .................................................... H02J 7/0029
USPC ........................................................ 320/134
See application file for complete search history.

(56) References Cited

U.S. PATENT DOCUMENTS

| | | |
|---|---|---|
| 2007/0216359 A1 | 9/2007 | Arai et al. |
| 2010/0097033 A1 | 4/2010 | Tange |
| 2010/0244847 A1* | 9/2010 | Kudo ...................... B60L 58/12 324/433 |
| 2011/0267726 A1 | 11/2011 | Ikeuchi et al. |
| 2013/0181513 A1* | 7/2013 | Yano ...................... B60L 50/62 307/10.1 |

FOREIGN PATENT DOCUMENTS

JP 2010-124681 6/2010

* cited by examiner

*Primary Examiner* — Eric D Lee
(74) *Attorney, Agent, or Firm* — IPUSA, PLLC

(57) ABSTRACT

A secondary battery protection apparatus includes a plurality of secondary battery protection apparatuses. One of two adjacent secondary battery protection apparatuses includes a voltage determination unit that is not affected by a current transfer signal and configured to receive, through a single communication line, the current transfer signal that is transmitted from the other of the two adjacent battery protection apparatuses through the single communication line and an information element based on changes of a voltage value of a voltage transfer signal, and a current determination unit that is not affected by the voltage transfer signal and configured to receive, through the single communication line, the voltage transfer signal that is transmitted from the other of the two adjacent secondary battery protection apparatuses through the single communication line and an information element based on changes of the current value of the current transfer signal.

10 Claims, 12 Drawing Sheets

SECONDARY BATTERY PROTECTION APPARATUS

CROSS-REFERENCE TO RELATED APPLICATIONS

This is a divisional application of U.S. patent application Ser. No. 15/091,716, filed on Apr. 6, 2016, which is based upon and claims the benefit of priority of Japanese Patent Application No. 2015-089633 filed on Apr. 24, 2015, the entire contents of which are incorporated herein by reference.

BACKGROUND OF THE INVENTION

1. Field of the Invention

The present disclosure relates to secondary battery protection systems, secondary battery protection apparatuses and methods for protecting secondary batteries.

2. Description of the Related Art

Recently, secondary batteries such as lithium-ion batteries are commonly provided. The secondary battery is attached to a battery charger to be charged. In this case, charge and discharge of the secondary battery are respectively controlled by an IC (Integrated Circuit), and the like. That is, the control of charge and discharge of the secondary battery is performed by a protection circuit that includes a protection function for protecting the secondary battery from overcharge and over discharge, a monitoring function for managing remaining charge amount of the secondary battery, and the like.

For example, in such a protection circuit, battery charger coupling recovery and voltage recovery are known as methods for recovery (herein after referred to as over discharge recovery) from a state where the over discharge is detected (over discharge state) to a normal state. Specifically, the battery charger coupling recovery is a method in which the state is recovered from the over discharge state to the normal state upon detecting that a battery charger is coupled to a battery pack.

FIG. 1 is a circuit diagram for illustrating an example conventional protection circuit adopting the battery charger coupling recovery. Specifically, the protection circuit 10 shown in FIG. 1 includes a charge/discharge control IC 20, a switch transistor M1, a switch transistor M2, a resistor R1, a resistor R2, a B+ terminal, a B− terminal, a P+ terminal and a P− terminal. Further, the charge/discharge control IC 20 includes a comparator 21, a reference voltage Vref, a logic circuit 22, a switch SW1 and a pull-up resistor R3.

A secondary battery B1 is connected between the B+ terminal and the B− terminal, and a battery charger or a load is connected between the P+ terminal and the P− terminal. Also, in a case where the battery charger is connected between the P+ terminal and the P− terminal and a battery voltage of the secondary battery B1 is greater than or equal to a threshold voltage for overcharge detection, the charge/discharge control IC 20 detects the overcharge of the secondary battery B1. Moreover, upon detecting the overcharge, the logic circuit 22 stops charging operation by outputting a control signal for turning off the switch transistor M2 from a terminal OV.

Also, in a case where the load is connected between the P+ terminal and the P− terminal and a battery voltage of the secondary battery B1 is equal to or less than a threshold voltage for over discharge detection, the charge/discharge control IC 20 detects the over discharge of the secondary battery B1. Moreover, upon detecting the over discharge, the logic circuit 22 stops discharging operation by outputting a control signal for turning off the switch transistor M1 from a terminal DCHG.

In the following, the over discharge recovery operation of the charge/discharge control IC 20 will be described. First, upon the charge/discharge control IC 20 detecting the over discharge, the logic circuit 22 turns off the switch transistor M2 and turns on the switch SW1, thereby pulling up a potential at the V− terminal to be a VDD potential through the load and a pull-up resistor R3. Also, in a case where the load between the P+ terminal and the P− terminal is disconnected and a battery charger is connected between the P+ terminal and the P− terminal, a potential at the P− terminal becomes equal to or less than VSS and a potential at the V− terminal becomes a potential corresponding to a voltage equal to or less than the reference voltage Vref. Further, the charge/discharge control IC 20 performs the over discharge recovery upon the potential at the V− terminal being equal to or less than the reference voltage Vref.

Also, a method is disclosed in Patent Document 1, in which a charge operation is prevented even if a power supply voltage is equal to or less than a minimum operation voltage of a circuit by setting a potential for turning off a signal output transistor at a gate of the signal output transistor disposed at a terminal for transmitting an overcharge detection signal in a battery apparatus including the circuit for monitoring a state of cascade-connected batteries.

However, according to the conventional method, in a case where a plurality of battery protection apparatuses for protecting the secondary battery cell are connected, a signal indicating detection information of overcharge, over discharge, temperature protection, etc., is transmitted from a high-potential side to a low-potential side, while information of load or connection state of the battery charger is not transmitted from the low-potential side to the high-potential, side. Therefore, in the conventional method, the information may be transmitted in one direction such as a direction from the high-potential side to low-potential side. Hence, functions may be limited since the information cannot be transmitted bidirectionally.

RELATED ART DOCUMENT

Patent Document

[Patent Document 1]: Japanese Laid-open Patent Publication No. 2010-124681

SUMMARY OF THE INVENTION

An object of disclosure of the present technology is to provide a battery protection system, a battery protection apparatus and a battery protection method enabling a bidirectional transmission of information between a plurality of battery protection apparatuses by using a single line.

According to one embodiment of the present invention, there is provided a secondary battery protection system including a plurality of secondary battery protection apparatuses, each of the plurality of secondary battery protection apparatuses being connected in parallel with a plurality of secondary battery cells connected in series, wherein signal transmissions are performed between the plurality of the secondary battery protection apparatuses, wherein the secondary battery protection system comprises: a first secondary battery protection apparatus among the plurality of battery protection apparatuses, which is connected to a first secondary battery cell of the battery cells, the first secondary battery protection apparatus comprising: a current transmission unit configured to generate and transmit a current transmission signal upon a first condition being met, a current value of the current transmission signal corresponding to the first condition being set; and a voltage determination unit configured to determine a voltage value of a voltage transmission signal based on a threshold value; and a second secondary battery protection apparatus of the secondary battery protection apparatuses connected to a second secondary battery cell directly connected to the first battery cell in the series connection of the secondary battery cells, comprising: a voltage transmission unit configured to generate and transmit the voltage transmission signal upon a second condition being met, a voltage value of the voltage transmission signal corresponding to the second condition being set; and a current determination unit configured to determine a current value of the current transmission signal based on a threshold value; wherein the current transmission signal and the voltage transmission signal are transmitted sharing a single communication line, and wherein a voltage amplitude of the voltage transmission signal transmitted from the second secondary battery protection apparatus to the first secondary battery protection apparatus is equal to or less than a predetermined voltage wherein the predetermined voltage is less than a voltage across one of the secondary battery cells, and the predetermined voltage is less than a withstand voltage of the first secondary battery protection apparatus.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

In the following, embodiments will be described with reference to accompanying drawings.

Example General Arrangement

Figure 1:
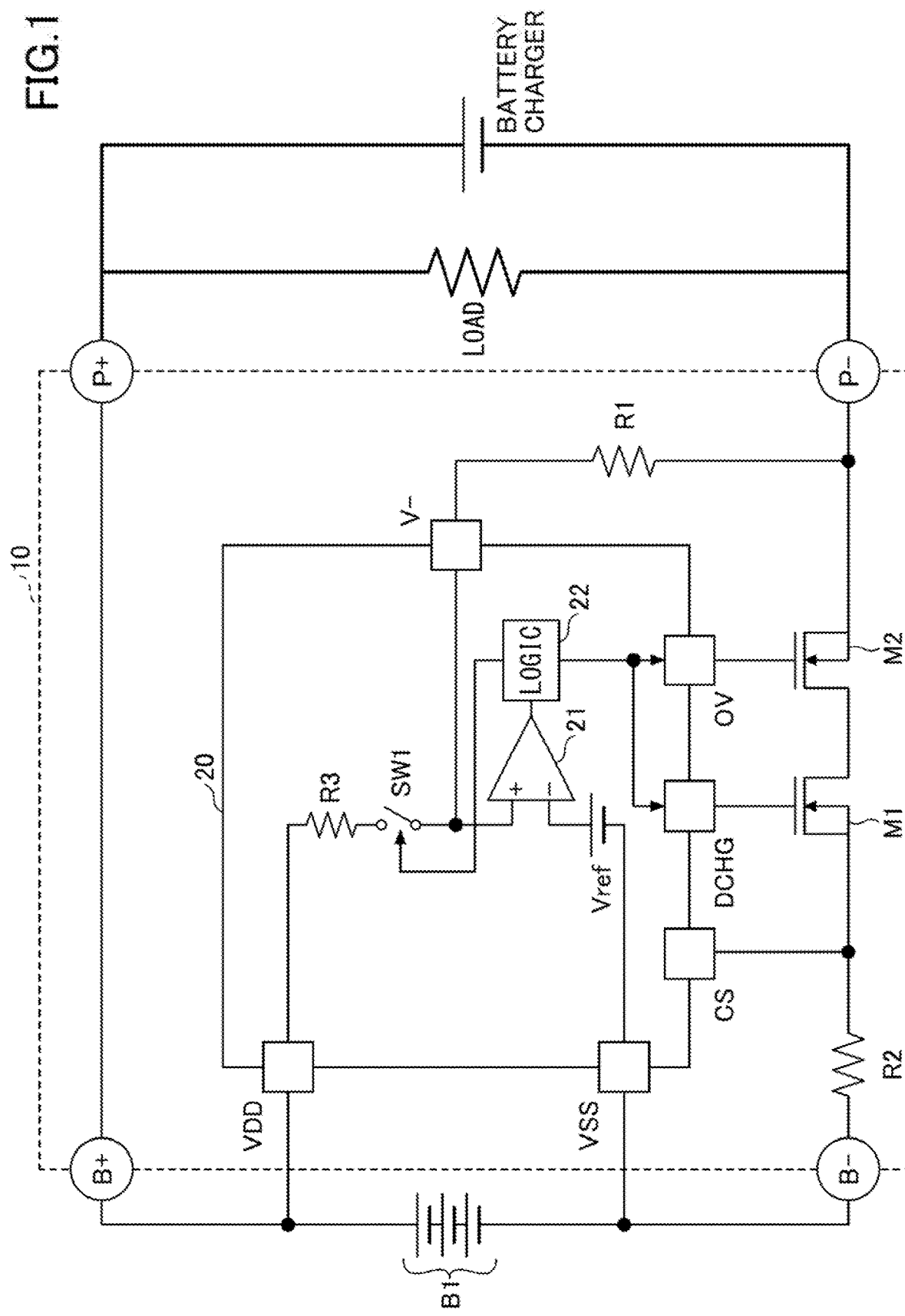
FIG. 1 is a circuit diagram for illustrating an example conventional protection circuit adopting a battery charger coupling recovery.
Figure 2:
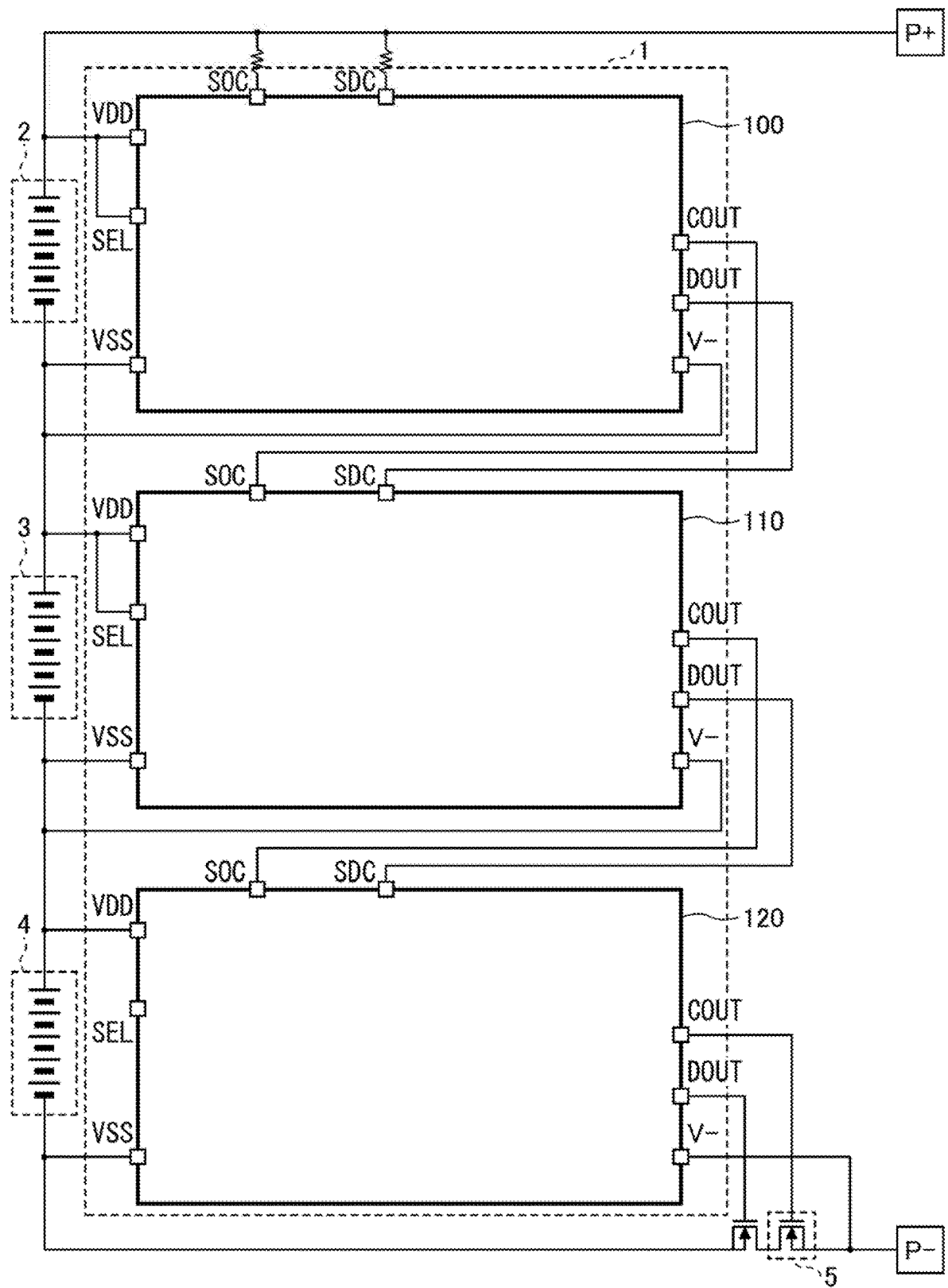
FIG. 2 is a diagram for illustrating a general arrangement of an example battery protection system of the present embodiment.

FIG. 2 is a diagram for illustrating a general arrangement of an example battery protection system of the present embodiment. In the following, as described in FIG. 2, descriptions are given in a case where the battery protection system 1 includes a device 100 as an example of a first secondary battery protection apparatus, a device 110 as an example of a third battery protection apparatus and a device 120 as an example of second secondary battery protection apparatus. Also, as shown in FIG. 2, a secondary battery cell 2, a secondary battery cell 3 and a secondary battery cell 4 are connected in series. That is, for example, the battery protection system 1 is used in a high voltage battery set, etc., in which a plurality of the secondary battery cells are connected in series.

The P+ terminal and the P− terminal are output terminals of the secondary battery cell. That is, a load driven by using electric power of a battery charger or the secondary battery cell is connected between the P+ terminal and the P− terminal.

Also, in FIG. 2, the P+ terminal side is a high-potential side, while the P− terminal side is a low-potential side. That is, in the battery protection system 1, the device 100 is at the high-potential side and the device 110 is disposed in the low-potential side of the device 100. Meanwhile, the device 110 is disposed in the high-potential side of the device 120 and the device 120 is at the low-potential side.

Example Battery Protection Apparatus

Figure 3:
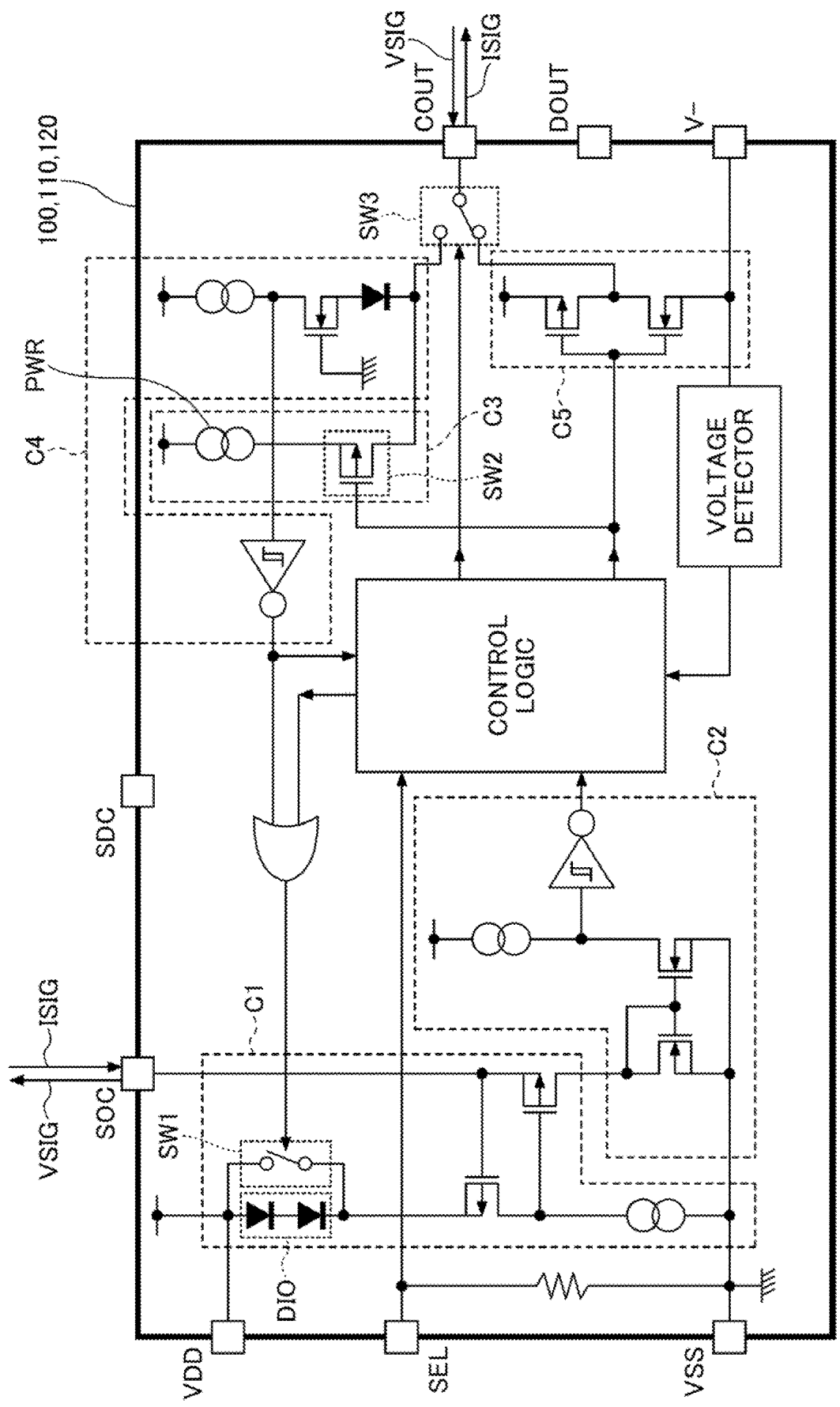
FIG. 3 is a circuit diagram for illustrating an example battery protection apparatus of the present embodiment.

FIG. 3 is a circuit diagram for illustrating an example battery protection apparatus of the present embodiment. For example, the device 100 has a configuration shown in FIG. 3. Also, for example, the device 110 and the device 120 respectively have the similar configuration to that of the device 100 shown in FIG. 3. In the following, the device 100 will be described as an example.

The device 100 includes a voltage clamp circuit C1, a current determination circuit C2, a current output circuit C3, a voltage determination circuit C4 and a charge/discharge control circuit C5. The device 100 includes a transmission/reception terminal COUT and a transmission/reception terminal SOC. Also, the device 100 includes a first power supply terminal VDD and a second power supply terminal VSS. As shown in FIG. 2, the device 100 is connected in parallel with the secondary battery cell through the first power supply terminal VDD and the second power supply terminal VSS. That is, the device 100 is an example battery protection apparatus powered by the secondary battery cell.

Moreover, the device 100 includes a input terminal SEL and a CMOS (Complementary Metal Oxide Semiconductor). The device 100 switches an output mode of the transmission/reception terminal COUT based on a logic signal input at the input terminal SEL.

Like the device 110 and device 120 shown in FIG. 2, in a case where another device (hereinafter, the other device may be referred to as a "higher device") is connected in the high-potential side, the transmission/reception terminal SOC is coupled to the transmission/reception terminal COUT included in the higher device. Additionally, in FIG. 2, the device 100 (hereinafter, the device may be referred to as a "highest device") is connected at the highest potential position.

Also, like the device 100 and the device 110 shown in FIG. 2, in a case where another device (hereinafter, the other device may be referred to as a "lower device") is connected in the low-potential side, the transmission/reception terminal COUT included in the higher device is coupled to the transmission/reception terminal SOC included in the lower device. In this case, the transmission/reception terminal COUT included in the higher device outputs a current transmission signal to be received at the transmission/reception terminal SOC included in the lower device. Also, the transmission/reception terminal SOC included in the lower device outputs a voltage transmission signal to be received at the transmission/reception terminal. COUT included in the higher device.

On the other hand, like the device 120 shown in FIG. 2, in a case where the device (hereinafter the device may be referred to as a "lowest device") is connected at the lowest potential position, the transmission/reception terminal COUT is, for example, coupled to a n-type MOSFET (Metal Oxide Semiconductor Field Effect Transistor; hereinafter referred to as "FET 5") for controlling charge/discharge operation, etc., as shown in FIG. 2. Also, the lowest device includes a V-terminal tor measuring a potential. For example, the V-terminal is coupled to the P– terminal as shown in FIG. 2. Therefore, the lowest device can measure a voltage at the P– terminal by using the V– terminal.

The FET 5 performs a control to charge the secondary battery cell. Specifically, the lowest device transmits a control signal through the transmission/reception terminal COUT. Also, the transmission/reception terminal COUT included in the lowest device is coupled to a gate included in the FET 5. The lowest device performs a control to charge the secondary battery cell based on the control signal, thereby protecting the secondary battery cell.

Example Voltage Clamp Circuit

As shown in FIG. 3, the voltage clamp circuit C1 includes a switch SW1. The voltage clamp circuit C1 switches a voltage at the transmission/reception terminal SOC by switching the switch SW1. Also, the voltage clamp circuit C1 is a circuit for performing a clamp operation so as to prevent the voltage at the transmission/reception terminal SOC form being equal to or less than a predetermined voltage. Additionally, the voltage at the transmission/reception terminal. SOC is determined by the voltage clamp circuit C1, and is a voltage of the voltage transmission signal VSIG transmitted from the transmission/reception terminal SOC to the higher device.

The voltage at the transmission/reception terminal SOC is VSOC in a case where the switch SW1 is closed. Upon the switch SW1 being opened, the voltage at the transmission/reception terminal SOC drops due to the diode DIO. Here, an amount of the voltage decreased due to the respective diodes is referred to Vf. For example, as shown in FIG. 3, in a case where the voltage clamp circuit C1 includes two diodes DIO, upon the switch SW1 being open, the voltage at the transmission/reception terminal SOC decreases by 2×Vf due to the two diodes DIO. Additionally, a number of diodes DIO is not limited to two, but may be changed according to the switched voltage at the transmission/reception terminal SOC.

That is, the voltage clamp circuit C1 sets the voltage at the transmission/reception terminal SOC to be one of "VSOC", or "VSOC-2×Vf" through the operation of the SW1. In this case, one of the voltages is used as a detection voltage. In the following, descriptions are given in a case where the detection voltage is "VSOC-2×Vf". Further, the voltage clamp circuit C1 performs the clamp operation so as to prevent the voltage at the transmission/reception terminal SOC form being equal to or less than the voltage "VSOC-2×Vf". Additionally, current of the current transmission signal ISIG transmitted to the transmission/reception terminal SOC from the higher device does not affect the voltage clamped by the voltage clamp circuit C1.

Example Current Determination Circuit

The current determination circuit C2 determines the current input at the transmission/reception terminal SOC. Specifically, the current determination circuit C2 determines whether the current of the current transmission signal ISIG is a detection current. Additionally, the current of the current transmission signal ISIG is switched by the higher device transmitting the current transmission signal ISIG.

Example Current Output Circuit

The current output circuit C3 outputs the current transmission signal ISIG at the detection current. Specifically, the current output circuit C3 outputs the current transmission signal ISIG to the lower device. The current transmission signal ISIG transmitted from the transmission/reception terminal COUT is received at the transmission/reception terminal SOC included in the lower device. Additionally, the voltage of the voltage transmission signal VSIG does not affect the current output by the current output circuit C3, where the voltage transmission signal VSIG is transmitted from the transmission/reception terminal SOC included in the lower device to the transmission/reception terminal COUT.

Also, the current output circuit C3 includes one or more constant current source PWR. The current output circuit C3 performs on/off control through the switch SW2 upon a predetermined condition being met. According to the on/off control, the current output circuit C3 can switch the current of the current transmission signal ISIG output from the transmission/reception terminal COUT to be the detection current or current other than the detection current.

Example Voltage Determination Circuit

The voltage determination circuit C4 determines the voltage of the voltage transmission signal VSIG. That is, the voltage determination circuit C4 determines whether the voltage of the voltage transmission signal VSIG is the detection voltage. Additionally, the voltage of the voltage transmission signal VSIG is switched by the lower device.

Example Charge/Discharge Control Circuit

The charge/discharge control circuit C5 transmits a control signal for controlling to charge or discharge the secondary battery cell from the transmission/reception terminal COUT. Additionally, a type of a signal output from the transmission/reception terminal COUT is defined depending on whether the device is the lowest device. Specifically, in the lowest device such as the device 120 shown in FIG. 2, the switch SW3 is set as shown in FIG. 3, and the control signal for controlling to charge the secondary battery cell is output from the transmission/reception terminal COUT. In this case, the transmission/reception terminal COUT is coupled to the FET 5 like that of the device 120 shown in FIG. 2.

On the other hand, in a device such as the device 100 or device 110 shown in FIG. 2 which is not the lowest device, the switch SW3 is switched, and the current output circuit C3 transmits the current transmission signal ISIG from the transmission/reception terminal COUT to the lower device, and the voltage transmission signal VSIG is received by the voltage determination circuit C4.

As shown in FIG. 2 and FIG. 3, respective devices switch the switch SW3 according to whether the own device is the lowest device or not. Thus, the transmission/reception terminal COUT is set to be a transmission terminal for transmitting the control signal or a transmission/reception terminal for transmitting the current transmission signal ISIG and for receiving the voltage transmission signal VSIG in accordance with the switch operation of the switch SW3. Therefore, the transmission/reception terminal COUT can be commonly used among the devices, and a number of terminals included in the device can be reduced.

Additionally, the terminal for transmitting the current transmission signal ISIG may be provided separately from the terminal for transmitting the control signal for charging or discharging the secondary battery cell.

Example Overcharge Detection Process

Figure 4:
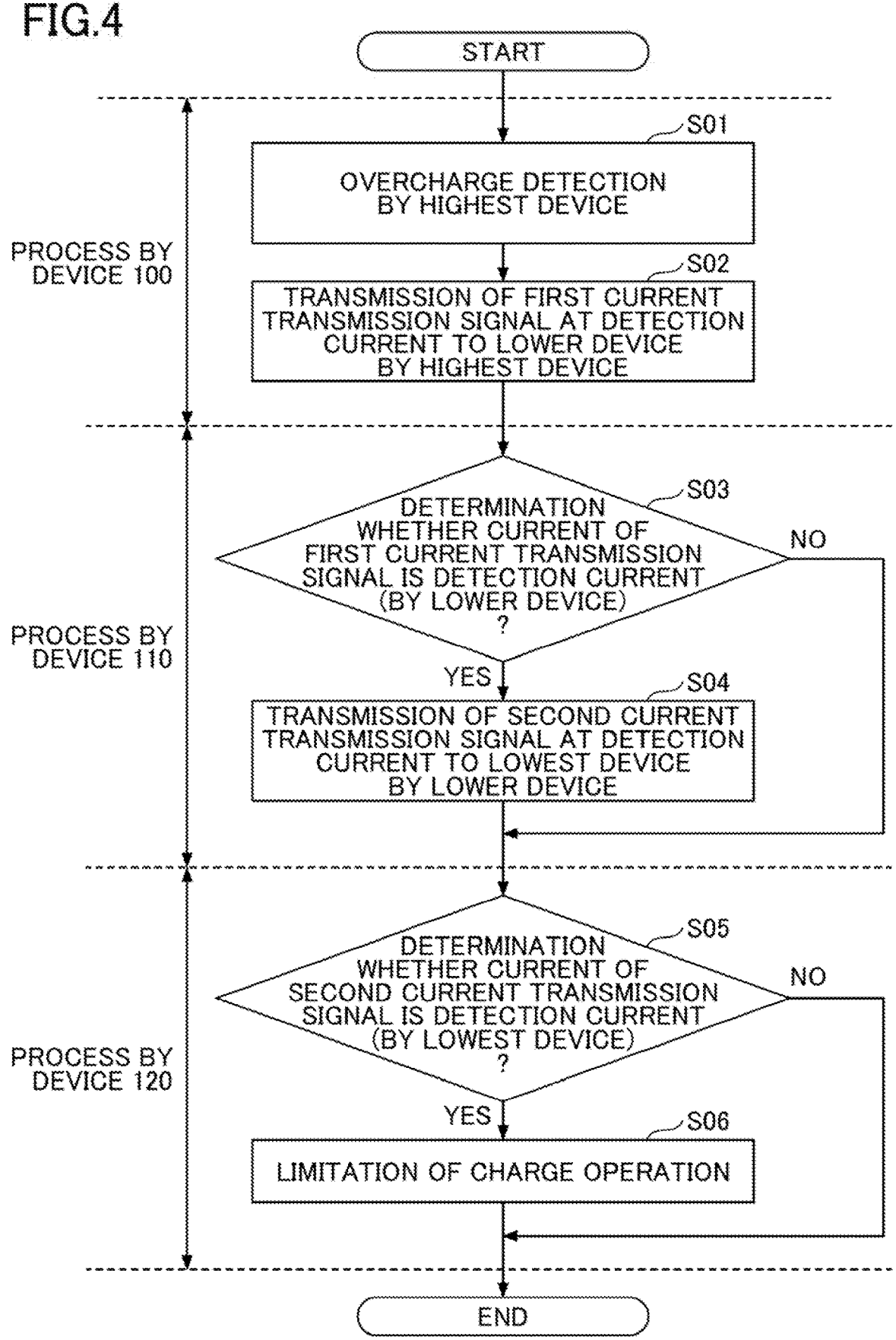
FIG. 4 is a flowchart for illustrating an example overcharge detection process performed by the battery protection system of the present embodiment.

FIG. 4 is a flowchart for illustrating an example overcharge detection process performed by the battery protection system of the present embodiment. That is, in the example overcharge detection process shown in FIG. 4, a detection result of the overcharge detection is transmitted from the highest device to the lower device, where a first condition is that the overcharge of the secondary battery cell is detected.

Example Overcharge Detection by Highest Device (Step S01)

In step S01, the device 100 detects the overcharge. Specifically, the device 100 measures the voltage of the secondary battery cell through the first power supply terminal VDD and the second power supply terminal VSS, and detects the overcharge in response to the measured voltage being greater than or equal to a predetermined voltage.

Example Transmission of First Current Transmission Signal at Detection Current to Lower Device by Highest Device (Step S02)

In step S02, the device 100 transmits a first current transmission signal at the detection current to the device 110 upon detecting the overcharge.

Example Determination Whether Current of First Current Transmission Signal is Detection Current by Lower Device (Step S03)

In step S03, the device 110 determines whether the current of the first current transmission signal transmitted from the device 100 is the detection current. For example, the device 110 determines whether a value of the current of the first current transmission signal is greater than or equal to a threshold value for detecting the detection current, and thereby determines whether the current is detection current.

In a case where the current of the first current transmission signal is determined to be the detection current (YES in step S03), the process is forwarded to step S04. On the other hand, in a case where the current of the first current transmission signal is determined not to be the detection current (NO in step S03), the process is forwarded to step S05.

Example Transmission of Second Current Transmission Signal at Detection Current to Lowest Device by Lower Device (Step S04)

In step S04, the device 110 transmits the second current transmission signal at the detection current to the device 120.

Example Determination Whether Current of Second Current Transmission Signal is Detection Current by Lowest Device (Step S05)

In step S05, the device 120 determine whether the current of the second current transmission signal transmitted from the device 110 is the detection current. For example, similarly to the process of step S03, the device 120 performs the determination whether the current is the detection current.

In a case where the current of the second current transmission signal is determined to be the detection current (YES in step S05), the process is forwarded to step S06. On the other hand, in a case where the current of the second current transmission signal is determined not to be the detection current (NO in step S05), the overcharge detection process is terminated.

Example Limitation of Charge Operation (Step S06)

In step S06, the device 120 limits the charge operation by stopping the charge operation, and the like. Specifically, in step S06, the device 120 performs control for turning off the FET 5, and the like.

Figure 5:
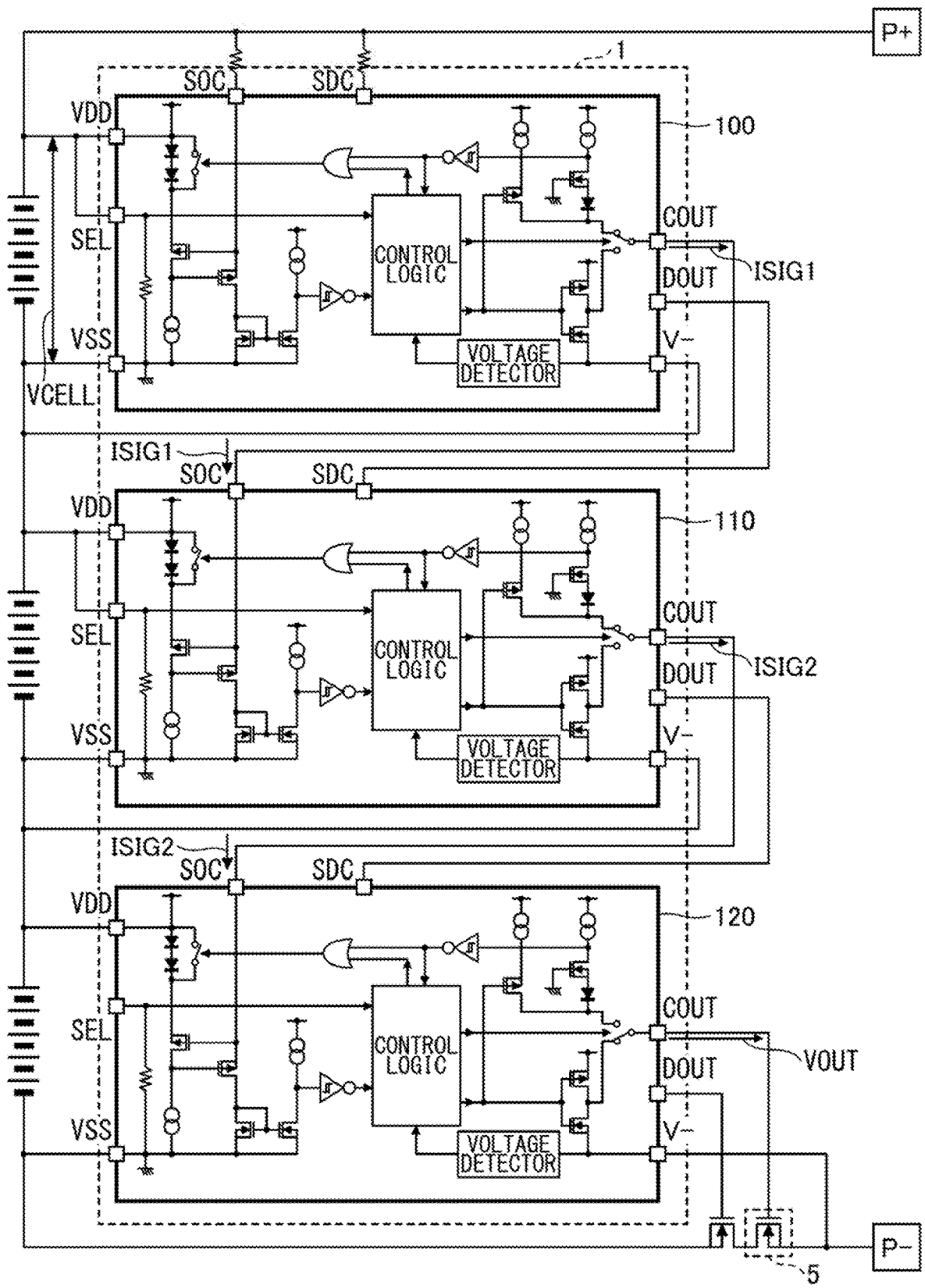
FIG. 5 is a circuit diagram for illustrating an example overcharge detection process of the battery protection system of the present embodiment.

FIG. 5 is a circuit diagram for illustrating an example overcharge detection process of the battery protection system of the present embodiment. Specifically, descriptions will be given in a case where the battery protection system shown in FIG. 2 performs the overcharge detection process shown in FIG. 4. That is, in FIG. 5, the first condition is that the overcharge is detected.

Upon detecting the overcharge based on the voltage VCELL of the secondary battery cell (step S01 in FIG. 4), the device 100 transmits the first current transmission signal ISIG1 at the detection current (step S02 FIG. 4). Then, the device 110 receives the first current transmission signal ISIG1 transmitted from the device 100 through the transmission/reception terminal SOC. Thus, in the battery protection system 1, the device 100 can report the overcharge detection result to the device 110.

In a case where the current of the first current transmission signal ISIG1 is determined to be the detection current by the device 110 (YES in step S03 in FIG. 4), the device 110 transmits the second current transmission signal ISIG2 at the detection current (step S04 in FIG. 4). Then, the device 120 receives the second current transmission signal ISIG2 transmitted from the device 110 through the transmission/reception terminal SOC. Thus, in the battery protection system 1, the device 110 can report the overcharge detection result to the device 120.

Upon the current of the second current transmission signal ISIG2 being determined to be the detection current (YES in step S05 in FIG. 4), the device 120 performs control for turning off the FET 5 with a control signal VOUT, etc., to limit the charge operation (step S06 in FIG. 4).

Figure 6:
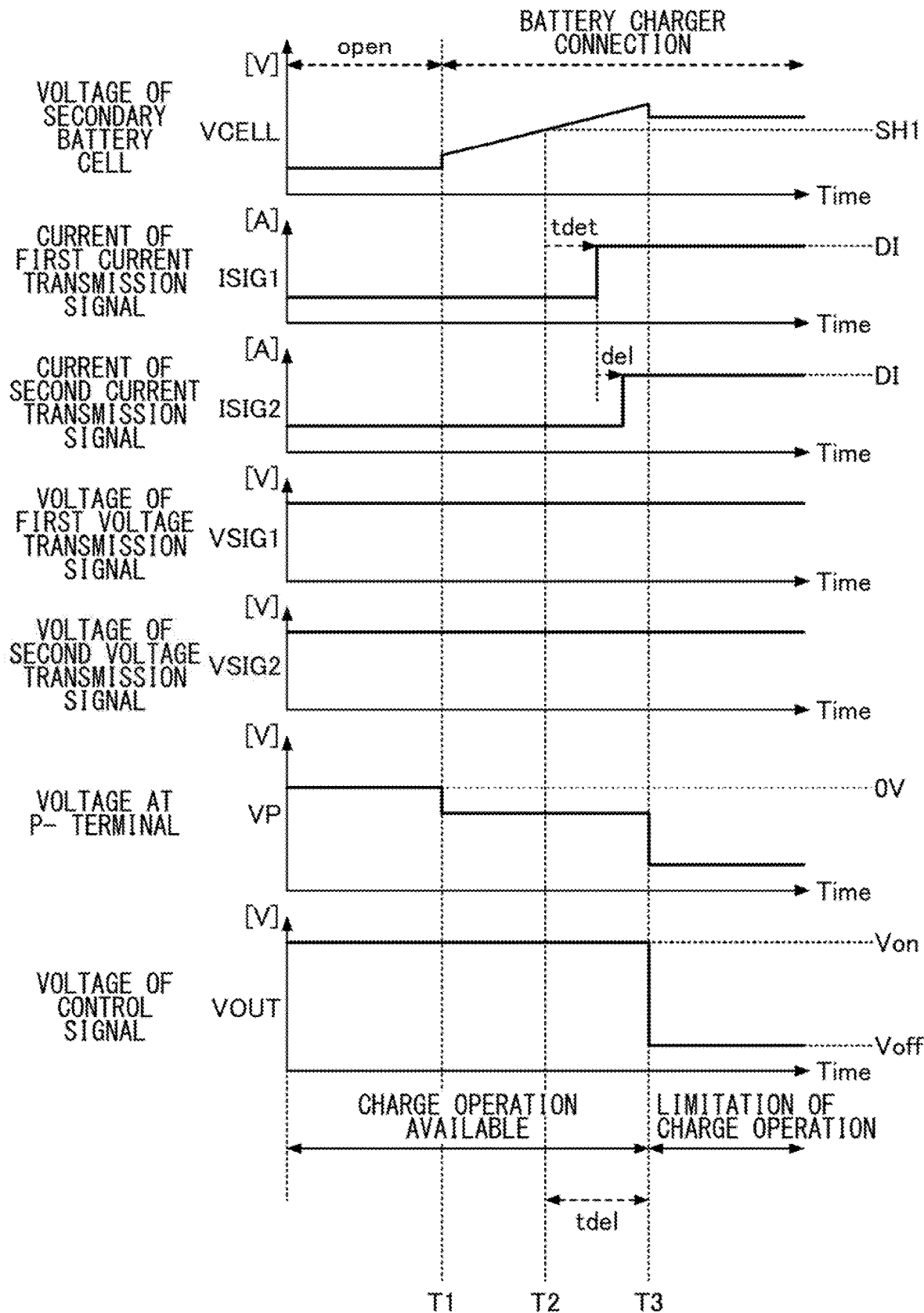
FIG. 6 is a timing diagram for illustrating an example processing result of the overcharge detection process performed by the battery protection system of the present embodiment.

FIG. 6 is a timing diagram for illustrating an example processing result of the overcharge detection process performed by the battery protection system of the present embodiment. Specifically, FIG. 6 is a timing diagram for illustrating change of respective current and voltages when performing respective processes described with reference to FIG. 4 and FIG. 5.

First, descriptions are given in a case where the battery charger is connected between the P+ terminal and the P− terminal to start charging the secondary battery cell at a charge start timing T1, where the P+ terminal and the P− terminal are output terminals of the secondary battery cell connected with the battery protection system 1 shown in FIG. 5.

Additionally, the voltage VCELL of the secondary battery cell shown in FIG. 6 corresponds to the voltage between the first power supply terminal VDD and the second power supply terminal VSS shown in FIG. 5. Also, the current of the first current transmission signal ISIG1 shown in FIG. 6 corresponds to the current output from the transmission/reception terminal COUT of the device 100 shown in FIG. 5 and the current input at the transmission/reception terminal SOC of the device 110. Further, the current of the second current transmission signal ISIG2 shown in FIG. 6 corresponds to the current output from the transmission/reception terminal COUT of the device 110 shown in FIG. 5 and the current input at the transmission/reception terminal SOC of the device 120. Moreover, the voltage of the first voltage transmission signal VSIG1 shown in FIG. 6 corresponds to the voltage input at the transmission/reception terminal COUT of the device 100 shown in FIG. 5 and the voltage output from the transmission/reception terminal SOC of the device 110. Also, the voltage of the second voltage transmission signal VSIG2 shown in FIG. 6 corresponds to the voltage input at the transmission/reception terminal COUT of the device 110 shown in FIG. 5 and the voltage output from the transmission/reception terminal SOC of the device 120. Further, the voltage at the P− terminal shown in FIG. 6 corresponds to a negative potential of a load driven by using electric power of battery charger or the secondary battery cell measured through the V− terminal included in the device 120 shown in FIG. 5. Moreover, the voltage of the control signal VOUT shown in FIG. 6 corresponds to the voltage of the control signal VOUT transmitted from the transmission/reception terminal COUT of the device 120 shown in FIG. 5 to the FET 5 and the voltage applied to gate of the FET 5.

Upon the battery charger starting the charge operation, the voltage VCELL of the secondary battery cell increases from the charge start timing T1 as shown in FIG. 6. Upon the voltage VCELL of the secondary battery cell reaching a overcharge detection voltage SH1, the device 100 detects the overcharge (step S01 in FIG. 4), where the voltage SH1 is set as a threshold voltage for detecting the overcharge. Also, a timing at which the overcharge is detected by the device 100 is a overcharge detection timing T2.

Upon detecting the overcharge, the device 100 transmits the first current transmission signal ISIG1 at the detection current DI (step S02 in FIG. 4). Additionally, a delay time from a timing at which the device 100 detects the overcharge to a timing at which the first current transmission signal ISIG1 is transmitted at the detection current DI is referred to as a detection delay "tdet".

Upon the device 100 transmitting the first current transmission signal ISIG1 at the detection current DI to the device 110 (YES in step S03 in FIG. 4), the device 110 transmits the second current transmission signal ISIG2 at the detection current DI to the device 120 (step S04 in FIG. 4). Also, a delay time from a timing at which the device 110 receives the first current transmission signal ISIG1 to a timing at which the second current transmission signal ISIG2 is transmitted is referred to as a transmission delay "del".

Upon the device 110 transmitting the second current transmission signal ISIG2 at the detection current DI to the device 120 (YES in step S05 in FIG. 4), the device 120 that is the lowest device turns a level of the control signal VOUT from Von (high) to Voff (low) (step S06 in FIG. 4). Additionally, FET 5 is turned on when the control signal VOUT is Von, which enables the charge operation. On the other hand, FET 5 is turned off when the control signal VOUT is Voff, which limits the charge operation.

Additionally, even when the first current transmission signal ISIG1 and the second current transmission signal ISIG2 are respectively transmitted at the detection current DI, the voltages of the first voltage transmission signal VSIG1 and the second voltage transmission signal VSIG2 are constant as shown in FIG. 6.

Also, a timing at which the device 120 turns the level of the control signal VOUT from Von to Voff is a limitation timing T3. A delay time from the overcharge detection timing T2 to the limitation timing T3 including the detection delay "tdet" and the transmission delay "del" is delay "tdel".

When the charge operation is limited, the rise of the voltage VCELL of the secondary battery cell after the limitation timing T3 is suppressed as shown in FIG. 6, thereby preventing the secondary battery from being overcharged. Also, in the battery protection system, the overcharge detection result detected by the highest device is transmitted from the high-potential side to low-potential side by using the current of the current transmission signal. That is, the lower device can receive information such as a overcharge detection result from the higher device by determining whether the current of the current transmission signal is the detection current DI. Therefore, a plurality of devices to be protected can share the information of the overcharge detection result.

Example Load Connection Detection Process

Figure 7:
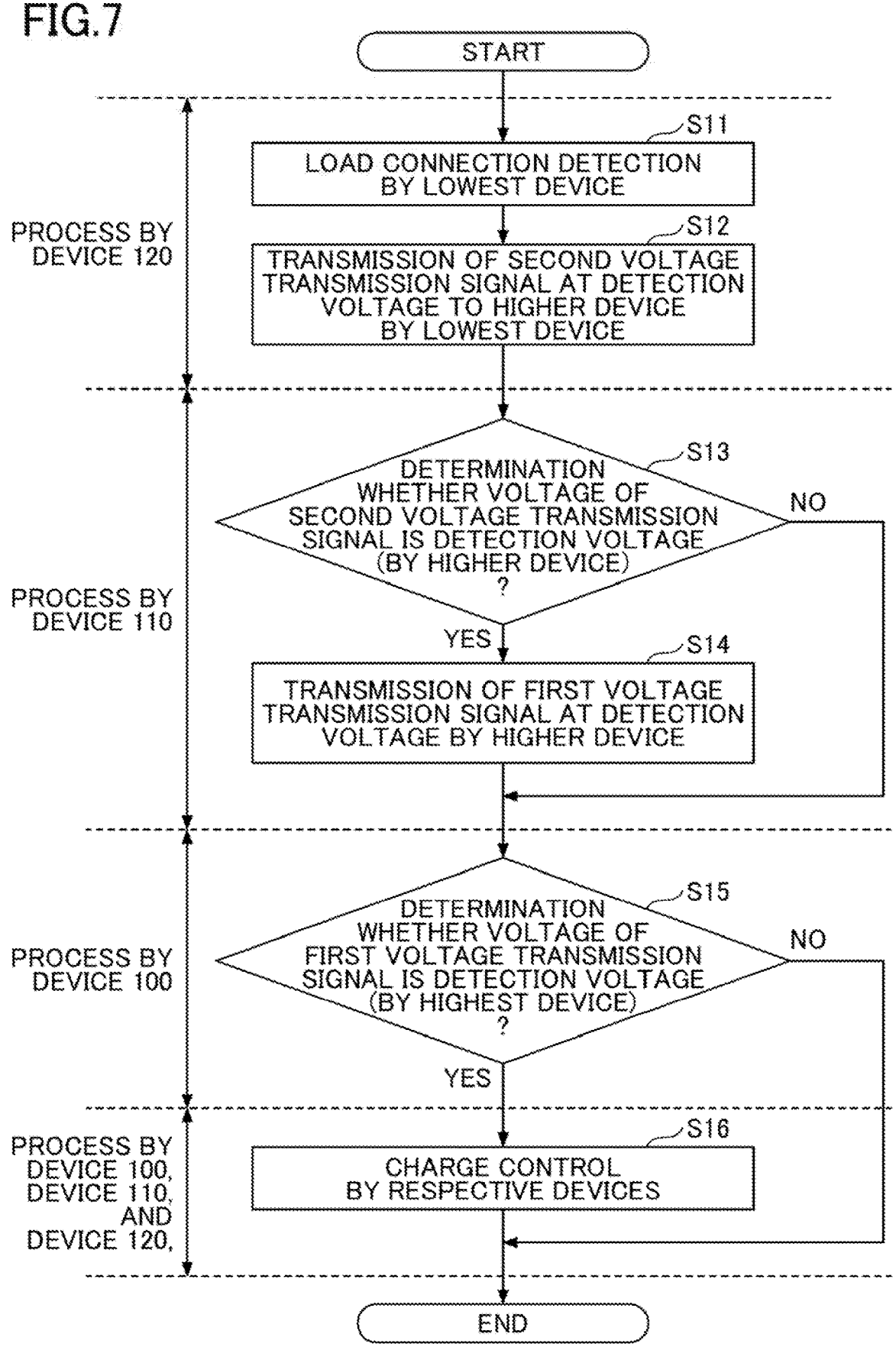
FIG. 7 is a flowchart for illustrating an example load connection detection process performed by the battery protection system of the present embodiment.

FIG. 7 is a flowchart for illustrating an example load connection detection process performed by the battery protection system of the present embodiment. Additionally, for example, the process shown in FIG. 7 is performed when a load using the electric power of the secondary battery cell is connected after detecting the overcharge of the secondary battery cell to limit the charge operation. That is, in the example load connection detection process shown in FIG. 7, the load connection detection result is transmitted from the lowest device to the higher device, where a second condition is that the connection of the load using the electric power of the secondary battery cell is detected.

Example Load Connection Detection by Lowest Device (Step S11)

In step S11, the device 120 detects the load connection. Specifically, the device 120 measures the voltage at the P– terminal through the V– terminal. Upon the measured voltage being greater than or equal to a predetermined voltage, the device 120 detects that the load is connected. That is, upon discharge current flowing due to the connected load, the voltage at the P– terminal increases due to a body diode (also referred to as a parasitic diode or a built-in diode) included in the FET 5. The device 120 can detect the rise of the voltage through the V-terminal, and thereby detects that the load is connected (the load connection).

Example Transmission of Second Voltage Transmission Signal at Detection Voltage to Higher Device by Lowest Device (Step S12)

In step S12, upon detecting the load connection, the device 120 transmits the second voltage transmission signal at the detection voltage to the device 110.

Example Determination Whether Second Voltage Transmission Signal is Detection Voltage by Higher Device (Step S13)

In step S13, the device 110 determines whether the voltage of the second voltage transmission signal transmitted from the device 120 is the detection voltage. For example, the device 110 determines whether the voltage of the second voltage transmission signal is equal to or less than a threshold voltage for determining the detection voltage, and thereby determines whether the voltage is the detection voltage.

In a case where the voltage of the second voltage transmission signal is determined to be the detection voltage (YES in step S13), the process is forwarded to step S14. On the other hand in a case where the voltage of the second voltage transmission signal is determined not to be the detection voltage (NO in step S13), the process is forwarded to step S15.

Example Transmission of First Voltage Transmission Signal at Detection Voltage by Higher Device (Step S14)

In step S14, the device 110 transmits the first voltage transmission signal at the detection voltage to the device 100.

Example Determination Whether Voltage of First Voltage Transmission Signal is Detection Voltage by Highest Device (Step S15)

In step S15, the device 100 determines whether the voltage of the first voltage transmission signal transmitted from the device 110 is the detection voltage. For example, similarly to the process of step S13, the device 100 determines whether the voltage is the detection voltage.

In a case where the first voltage transmission signal is determined to be the detection voltage (YES in step S15), the process is advanced to step S16. On the other hand, in a case where the first voltage transmission signal is determined not to be the detection voltage (NO in step S15), the load connection detection process is terminated.

Example Charge Control by Respective Devices (Step S16)

In step S16, the device 100, the device 110 and the device 120 control charge operation. For example, in a case where the load connection is detected and the voltage of the secondary battery cell is less than an overcharge detection voltage SH1, the device 120 releases the limitation of the charge operation performed in step S06 shown in FIG. 4, and the like. Specifically, in step S16, the device 120 performs a control for turning on the FET 5, and the like.

Also, for example, the charge control is so called latch control, etc., performed based on information indicating that the load is connected, where the latch control is performed for releasing the limitation of the charge operation or for keeping the limitation of the charge operation until the load is connected.

Figure 8:
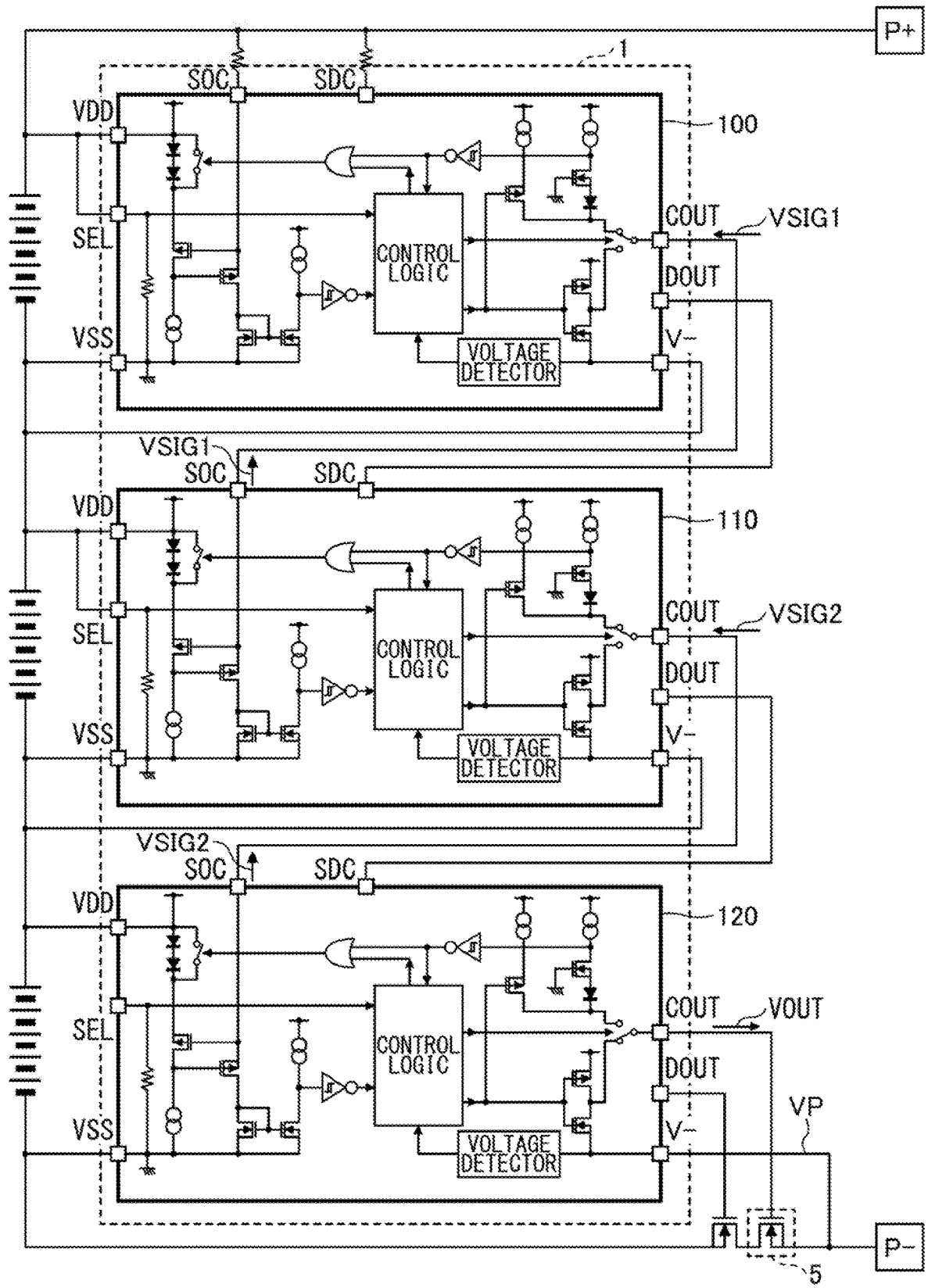
FIG. 8 is a circuit diagram for illustrating an example load connection detection process performed by the battery protection system of the present embodiment.

FIG. 8 is a circuit diagram for illustrating an example load connection detection process performed by the battery protection system of the present embodiment. Specifically, descriptions are given in a case where the load connection detection process shown in FIG. 7 is performed by the battery protection system 1 shown in FIG. 2. That is, in FIG. 8, the second condition is that the load connection is detected.

The device 120 detects that the load is connected (load connection) (step S11 in FIG. 7) based on the voltage VP at the V– terminal upon the voltage VP at the V– terminal increasing by a voltage amount greater than or equal to a predetermined amount. Upon detecting the load connection, the device 120 transmits the second voltage transmission signal VSIG2 at the detection voltage (step S12 in FIG. 7). Thus, in the battery protection system 1, the load connection detection result can be reported from the device 120 to the device 110.

Upon determining that the voltage of the second voltage transmission signal VSIG2 is the detection voltage (YES in step S13 in FIG. 7), the device 110 transmits the first voltage transmission signal VSIG1 at the detection voltage (step S14 in FIG. 7). Thus, in the battery protection system 1, the load connection detection result can be reported from the device 110 to the device 100.

In a case where the voltage of the first voltage transmission signal VSIG1 is determined to be the detection voltage (YES in step S15 in FIG. 7), the respective devices performs control of the charge operation such as releasing the limitation of the charge operation (step S16 in FIG. 7).

Figure 9:
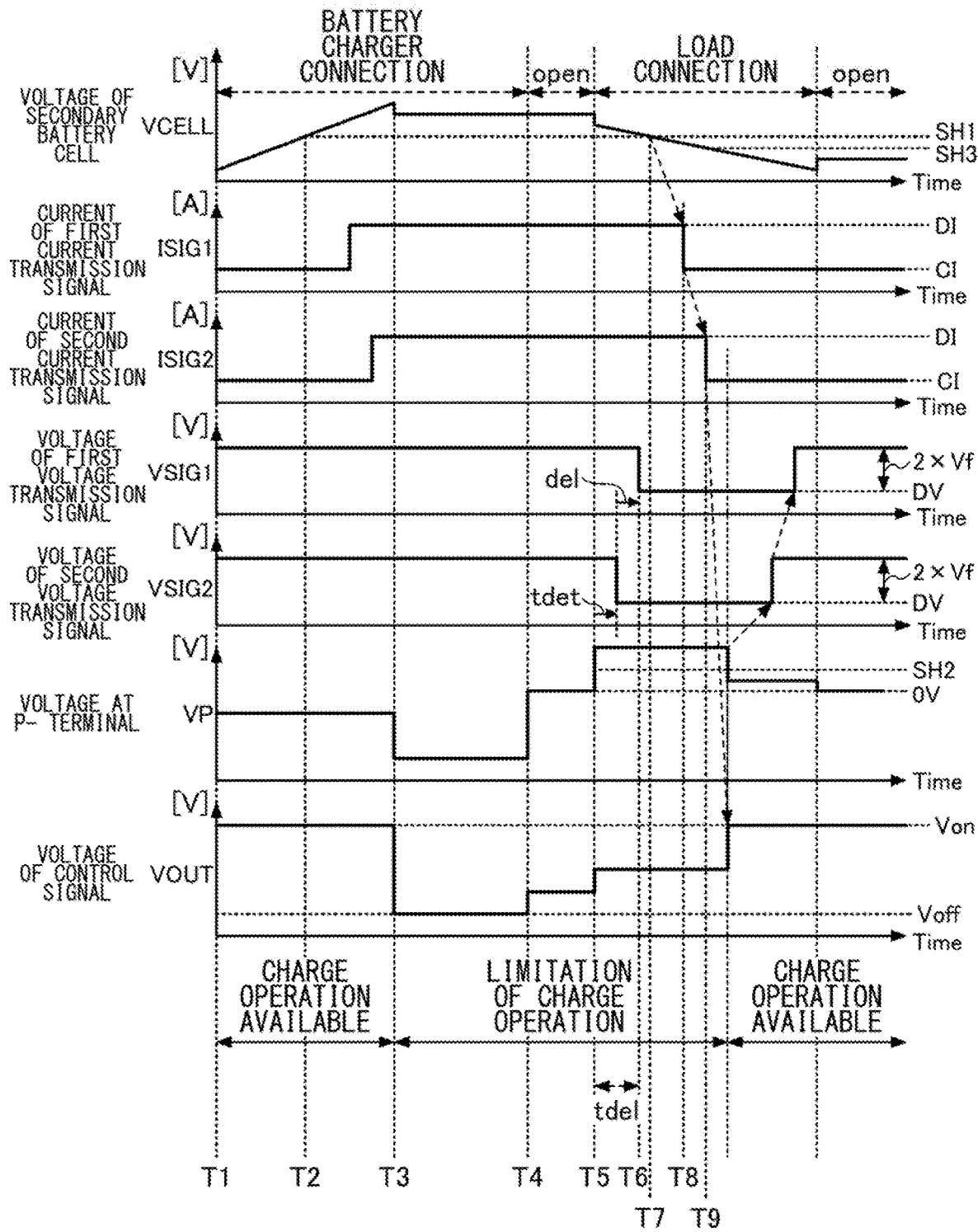
FIG. 9 is a timing diagram for illustrating an example processing result of the load connection detection process performed by the battery protection system of the present embodiment.

FIG. 9 is a timing diagram for illustrating an example processing result of the load connection detection process performed by the battery protection system of the present embodiment. Specifically, FIG. 9 is a timing diagram for illustrating change of respective current and voltages when performing respective processes described with reference to FIG. 7 and FIG. 8.

First, similarly to FIG. 6, descriptions are given in a case where the battery charger is connected between the P+ terminal and the P– terminal to start charging the secondary battery cell at the charge start timing T1, where the P+ terminal and the P– terminal are output terminals of the secondary battery cell connected with the battery protection system 1 shown in FIG. 5. Additionally, the timing diagram of FIG. 9 indicating respective current and voltages shows similar current, voltages and signals to those shown in FIG. 6. Therefore, descriptions thereof are omitted.

In FIG. 9, similarly to FIG. 6, the charge operation starts at the charge start timing T1, and the charge operation is limited at the limitation timing T3 after the overcharge is detected at the overcharge detection timing T2. Then, upon the battery charger being disconnected from the secondary battery cell at a battery charger disconnection timing T4, the output of the battery pack between the P+ terminal and the P− terminal becomes "open". Further, the load is connected at a load connection timing T5.

Upon the load is connected between the P+ terminal and the P− terminal, which correspond to output terminals of the secondary battery cell, the load starts to use the electric power charged in the secondary battery cell. Therefore, the voltage VCELL of the secondary battery cell starts to decrease at the load connection timing T5 as shown in FIG. 9.

Also, upon the load being connected at the load connection timing T5, the voltage at the V− terminal VP start to increase due to current flow through the body diode included in the FET 5. A load connection detection threshold value SH2 is provided for detecting the increase of the voltage due to the body diode included in the FET 5. Thus, as shown in FIG. 9, the device 120 can detect the load connection by determining whether the voltage VP at the V− terminal is greater than or equal to the load connection detection threshold value SH2. That is, at the load connection timing T5, the device 120 detects the load connection upon the voltage at the V− terminal VP being greater than or equal to the load connection detection threshold value SH2 (step S11 in FIG. 7).

Upon detecting the load connection, the second voltage transmission signal VSIG2 at the detection voltage DV is transmitted (step S12 in FIG. 7). Additionally, a delay time from the load connection timing T5, at which the load connection is detected by the device 120, to a timing, at which the second voltage transmission signal VSIG2 at the detection voltage DV is transmitted, is referred to as a detection delay "tdet". Also, the detection delay "tdet" shown in FIG. 9 is not always the same as the detection delay "tdet" shown in FIG. 6.

Additionally, the detection voltage DV is defined as a voltage reduced by a voltage of "2×Vf" due to the diode DIO in the device shown in FIG. 3.

Upon the device 120 transmitting the second voltage transmission signal VSIG2 at the detection voltage DV (YES in step S13 in FIG. 7), the device 110 transmits the first voltage transmission signal VSIG1 at the detection voltage DV (step S14 in FIG. 7). Also, a delay time from a timing at which the voltage of the second voltage transmission signal VSIG2 is determined to be the detection voltage DV to a timing at which the first voltage transmission signal VSIG1 at the detection voltage DV is transmitted is referred to as a transmission delay "del". Additionally, the transmission delay "del" shown in FIG. 9 is not always the same as the transmission delay "del" shown in FIG. 6.

A timing at which the device 100 receives the load connection detection result is a load connection detection timing T6. The delay "tdel" is a period from the load connection timing T5 at which the load connection is detected by the device 120 to the load connection detection timing T6 at which the highest device 100 receives the detection result.

After the load connection is detected, the voltage VCELL of the secondary battery cell decreases due to the load connection. Upon the voltage VCELL of the secondary battery cell becomes less than the overcharge detection voltage SH1, the respective devices start to control charge operation (step S16 in FIG. 7). Additionally, a timing at which the voltage VCELL of the secondary battery cell becomes less than the overcharge detection voltage SH1 is referred to as a overcharge resolving timing T7.

For example, as shown in FIG. 9, upon detecting the load connection and the decrease of the voltage VCELL of the secondary battery cell to less than the overcharge detection voltage SH1, the device 100 transmits the first current transmission signal ISIG1 at current (hereinafter referred to as "release current CI") other than the detection current. Then, the device 110 receives the first current transmission signal ISIG1 transmitted from the device 100 through the transmission/reception terminal SOC. Thus, in the battery protection system 1, a release of the limitation of the charge operation can be reported from the device 100 to the device 110. Additionally, in FIG. 9, the device 100 transmits the first current transmission signal ISIG1 at the release current CI at a first transmission signal output timing T8.

Further, the device 110 transmits the second current transmission signal ISIG2 at the release current CI. Then, the device 120 receives the second current transmission signal ISIG2 transmitted from the device 110 through the transmission/reception terminal SOC. Thus, in the battery protection system 1, the release of the limitation of the charge operation can be reported from the device 110 to the device 120. Additionally, in FIG. 9, the device 110 transmits the second current transmission signal ISIG2 at the release current CI at a second transmission signal output timing T9.

Upon the second current transmission signal ISIG2 at the release current CI is transmitted from the device 110 to the device 120, the device 120 that is the lowest device turns the control signal VOUT from "Voff" to "Von" (step S16 in FIG. 7). When the VOUT is "Von", the FET 5 is turned on to allow to perform the charge operation. That is, the limitation of the charge operation, which is performed in step S06 of FIG. 4, etc., is released.

Upon the voltage VCELL of the secondary battery cell being less than a predetermined value, the battery protection system 1 performs a control for permitting the charge operation. For example, a predetermined value for releasing the limitation of the charge operation is defined as a overcharge release voltage SH3. That is, the charge operation remains to be limited until the voltage VCELL of the secondary battery cell becomes less than the overcharge release voltage SH3.

However, the battery protection system 1 starts to perform the control for permitting the charge operation in response to the voltage VCELL of the secondary battery cell being less than the overcharge detection voltage SH1 because the load connection is detected before the voltage VCELL of the secondary battery cell becomes less than the overcharge release voltage SH3. That is, in the battery protection system 1, the control for permitting the charge operation can start earlier in comparison to a case where the limitation of the charge operation is released based on a comparison result of the voltage VCELL and the overcharge release voltage SH3.

In a case where the FET 5 is turned off in order to limit the charge operation, a discharge is carried out through the body diode included in the FET5. Therefore, the FET 5 is likely to be heated. Hence, preferably, the battery protection system 1 performs the control of the charge operation, such as an early release of the limitation of the charge operation, so as to reduce the heat of the FET 5. In the battery protection system 1, a timing to perform the control of the charge operation can be set to be earlier because information about the load connection detection result can be shared by a plurality of the devices.

Variation

The information shared by a plurality of devices is not limited to that related to the overcharge detection result and the load connection detection result. That is, the first condition is not limited to that the overcharge is detected, and the second condition is not limited to that the load connection to the secondary battery cell is detected. For example, the shared information may be related to a temperature in a case where the battery protection system 1 performs a protection operation related to the temperature. That is, the first condition or the second condition may be related to the temperature. In a case where the information related to the temperature is shared by a plurality of devices, similarly to a case (load connection detection result) of FIG. 9, the respective devices can perform the control of the charge operation based on the information related to the temperature.

Also, a plurality of threshold values for determining the detection current DI and for determining the detection voltage DV may be provided. In a case where the plurality of threshold values are provided, a plurality of types of information items can be reported or respective information items can be reported at a plurality of process stages in the battery protection system 1.

Moreover, although the information is reported from the higher device to the lower device based on the detection current in the above-described example of the battery protection system 1, the information may be reported based on the detection voltage. In this case, the information is reported from the lower device to the higher device based on the detection current in the battery protection system 1. That is, in the battery protection system 1, the detection current and the detection voltage may be used vice versa.

Also, three or more devices may be included in the battery protection system 1. For example, two or more third battery protection devices may be connected between the highest device and the lowest device. Specifically, for example in FIG. 2, the third battery protection apparatus corresponds to the device 110.

On the other hand, in the general arrangement of the secondary battery protection system 1, only two devices corresponding to the first secondary battery protection apparatus and the second secondary battery protection apparatus may be included.

Also, in the secondary battery protection system 1, it is not a limiting example that the overcharge detection is reported with the current transmission signal at a high level. For example, the overcharge detection may be reported with the current transmission signal at a low level. Similarly, in the battery protection system 1, it is not a limiting example that the release of the limitation of the charge operation is reported with the voltage transmission signal at a low level. For example, the release of the limitation of the charge operation may be reported with the voltage transmission signal at a high level. That is, in the battery protection system 1, the high level and the low level may be used vice versa.

Functional Configuration

Figure 10:
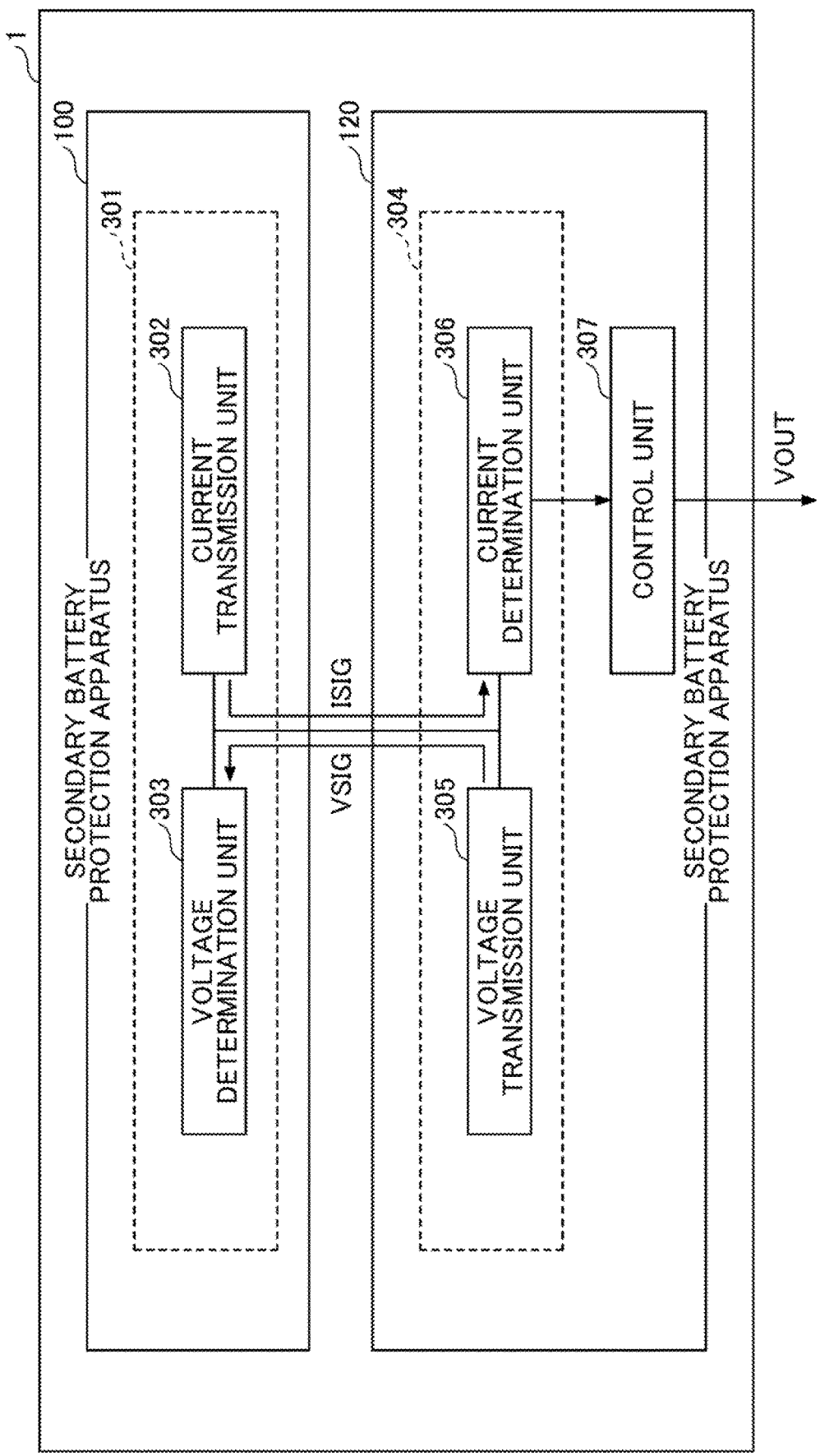
FIG. 10 is a block diagram for illustrating an example functional configuration of the battery protection system of the present embodiment.

FIG. 10 is a block diagram for illustrating an example functional configuration of the secondary battery protection system of the present embodiment. As shown in FIG. 10, the battery protection system 1 includes the device 100 as an example of the first secondary battery protection apparatus and the device 120 as an example of the second secondary battery protection apparatus.

The device 100 includes a first transmission/reception unit 301 for transmitting a current value and receiving a voltage value including a current transmission unit 302 and a voltage determination unit 303. Also, the device 120 includes a second transmission/reception unit 304 for transmitting a voltage value and receiving a current value including a voltage transmission unit 305 and a current determination unit 306. And a control unit 307 is also included in the device 120.

The first transmission/reception unit 301 includes the current transmission unit 302 for transmitting a current transmission signal ISIG and the voltage determination unit 303 for receiving a voltage transmission signal VSIG. Also, upon a first condition being met, the current transmission unit 302 transmits the current transmission signal ISIG at the detection current, and the voltage determination unit 303 determines whether the voltage of the voltage transmission signal VSIG is the detection voltage. Additionally, the first transmission/reception unit 301 is achieved by the current output circuit C3 (FIG. 3), the voltage determination circuit C4 and the transmission/reception terminal COUT (FIG. 3).

The second transmission/reception unit 304 includes the current determination unit 306 for receiving the current transmission signal ISIG transmitted from the first transmission/reception unit 301 and the voltage transmission unit 305 for transmitting the voltage transmission signal VSIG. Also, upon a second condition being met, the voltage transmission unit 305 transmits a voltage transmission signal VSIG, and the current determination unit 306 determines whether the current of the current transmission signal ISIG is the detection current. Additionally, the second transmission/reception unit 304 is achieved by the current determination circuit C2, the voltage clamp circuit C1 and the transmission/reception terminal SOC (FIG. 3).

The control unit 307 controls the charge operation of the secondary battery cell based on the determination result of the current determination unit 306 by using the control signal VOUT, and the like. Additionally, the control unit 307 is achieved by the charge/discharge control circuit C5 (FIG. 3) and the transmission/reception terminal COUT (FIG. 3).

The first transmission/reception unit 301 included in a higher device and the second transmission/reception unit 304 included in a lower device are connected through a single line, where the current transmission signal ISIG and the voltage transmission signal VSIG are transmitted through a single wire. Upon the first condition being met, e.g., the overcharge being detected, the first transmission/reception unit 301 of the highest device transmits the current transmission signal ISIG at the detection current. Thus, the current determination unit 306 of the lower device can receive information indicating detection result or the overcharge, and the like. Also, in a case where another lower device is further connected, the current transmission signal ISIG at the detection current is transmitted from the transmission/reception unit 301 of the higher device to the lower device. Thus, the information indicating detection result of the overcharge, etc., can be transmitted to respective devices of the highest device to the lowest device.

Meanwhile, upon the second condition being met, e.g., the load connection being detected, the second transmission/reception unit 304 and the voltage transmission unit 305 of the lowest device transmit the voltage transmission signal VSIG at the detection voltage. Thus, the voltage determination unit 303 of the higher device can receive information indicating detection result of the load detection, and the like. Also, in a case where another higher device is further connected, the voltage transmission signal VSIG at the detection voltage is transmitted from the second transmission/reception unit 304 and the voltage transmission unit 305 of the lower device to the higher device. Thus, the information indicating detection result of the load connection, etc., can be transmitted to respective devices from the lowest device to the highest device.

Therefore, in the battery protection system 1, for example, information can be transmitted from the higher device to the lower device by using the current value. Meanwhile, in the battery protection system 1, information can be transmitted from the lower device to the higher device by using the voltage value. Therefore, in the battery protection system 1, the information can be transmitted between the respective devices through the single line. Also, a number of terminals for the transmission/reception of the information included in the respective terminals can be reduced because the single line can be used. Moreover, the current transmission signal transmitted from the higher device to the lower device and the voltage transmission signal transmitted from the lower device to the higher device do not affect each other. Therefore, synchronization between the higher device and the lower device does not required, and bidirectional signal transmission can be always available.

Example Comparison

Figure 11:
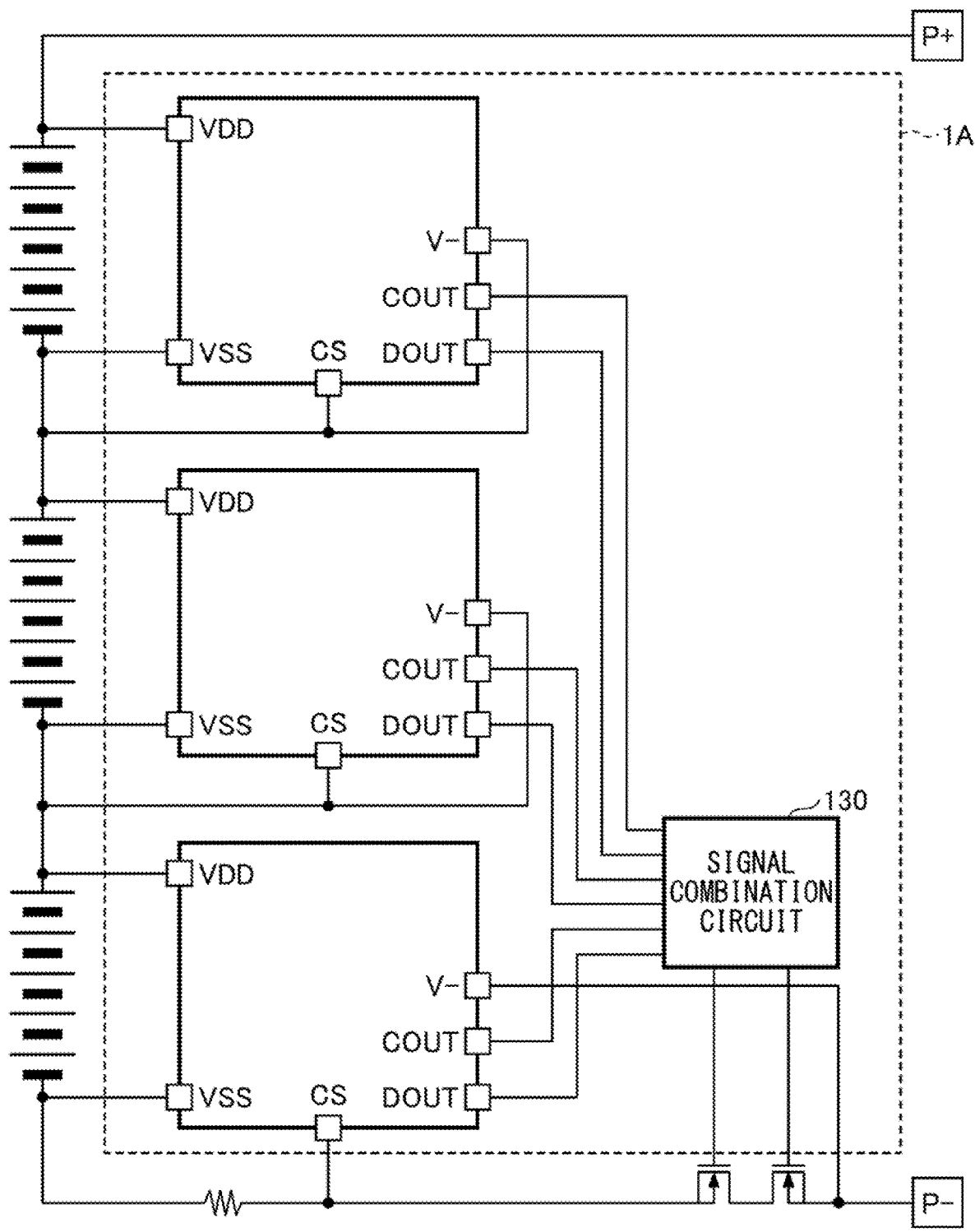
FIG. 11 is a circuit diagram for illustrating an example battery protection system of an example comparison.

FIG. 11 is a circuit diagram for illustrating an example battery protection system of an example comparison.

The battery protection system 1A further includes a signal combination circuit 130 other than the battery protection apparatuses. In the battery protection system 1A, the signal combination circuit 130 combines signals output from the respective battery protection apparatuses. In this way, the respective battery protection apparatuses share respective information.

The signal combination circuit 130 is an external circuit. Therefore, a number of parts increases in order to form the signal combination circuit 130. Also, the number of parts may further increase so as to achieve the bidirectional transmission of information, that is transmission from the higher device to the lower device and from the lower device to the higher device. Therefore, the battery protection system 1A has disadvantages, such as a complex circuit configuration, increase of implementation area, and increase of products of inferior quality. Further, in addition to the above described disadvantages, manufacturing cost may increase when a number of the secondary battery cells increase because high-voltage withstand parts in the signal combination circuit 130 are required.

Figure 12:
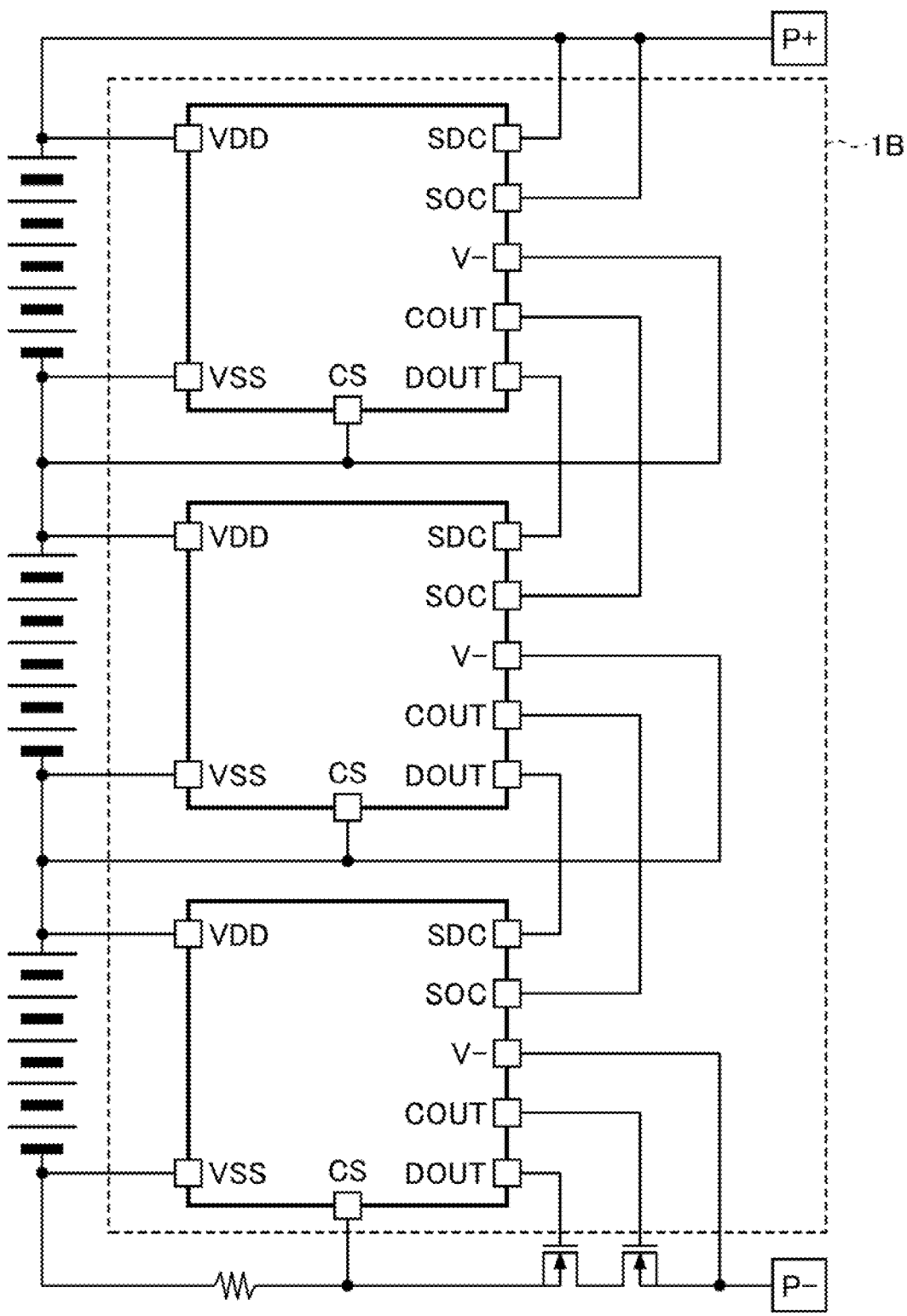
FIG. 12 is a circuit diagram for illustrating an example battery protection system of another example comparison.

FIG. 12 is a circuit diagram for illustrating an example battery protection system of another example comparison.

In a battery protection system 1B, information is transmitted from the higher device to the lower device, and the battery protection apparatuses respectively include reception terminals SOC. In the battery protection system 1B, the respective battery protection apparatuses transmits signals indicating abnormality to the lower devices. Therefore, in the battery protection system 1B, unidirectional transmission of the information from the higher device to the lower device is achieved. However, in order to transmit the information detected by the lowest device, etc., to the higher device, signal transmission from the lower device to the higher device needs to be achieved. Therefore, the battery protection system 1B has a disadvantage that a number of parts may increase because an external circuit will be required. Also, in a case where a transmission terminal is provided in the lower device and a reception terminal is provided in the higher device so as to achieve the transmission from the lower device to the higher device, manufacturing cost may increase due to increase of terminals, which causes another disadvantage.

Although the invention has been described with respect to example embodiments for a complete and clear disclosure, the appended claims are not to be limited to the described embodiments but are to be construed as embodying all modifications and alternative constructions that may occur to one skilled in the art that fairly fall within the basic teaching set forth herein.

What is claimed is:

1. A secondary battery protection apparatus including a plurality of secondary battery protection apparatuses that form a secondary battery protection system, each of the plurality of secondary battery protection apparatuses being connected in parallel with a plurality of secondary battery cells connected in series, wherein signal transmissions are performed between the plurality of the secondary battery protection apparatuses, said plurality of secondary battery protection apparatuses being connected to each other in cascade via a single communication line, wherein the secondary battery protection apparatus comprises:
   a current transmission unit configured to generate and transmit a current transfer signal to the single communication line upon a first condition being met, a current value of the current transfer signal being changed according to the first condition without changing a voltage;
   a voltage determination unit configured to determine a voltage value of a voltage transfer signal based on a threshold value;
   a voltage transmission unit configured to generate and transmit the voltage transfer signal to the single communication line upon a second condition being met, the voltage value of the voltage transfer signal being changed according to the second condition without changing a current; and
   a current determination unit configured to determine the current value of the current transfer signal based on a threshold value;
   wherein the current transfer signal and the voltage transfer signal are transmitted at a same time via the single communication line that is shared by two adjacent secondary battery protection apparatuses among the plurality of secondary battery protection apparatuses when each of the two adjacent secondary battery protection apparatuses is transmitting the voltage transfer signal and the current transfer signal to each other,
   wherein a voltage amplitude of the voltage transfer signal transmitted from each of the two adjacent secondary battery protection apparatuses is equal to or less than a predetermined voltage, the predetermined voltage being less than voltages of secondary battery cells connected to the two adjacent secondary battery protection apparatuses relative to a connecting point of the secondary battery cells and less than withstand voltages of the two adjacent secondary battery protection apparatuses,
   wherein one of the two adjacent secondary battery protection apparatuses comprises:

said voltage determination unit, that is configured not to be affected by the current transfer signal, and configured to receive, through the single communication line, the current transfer signal that is transmitted from the other of the two adjacent secondary battery protection apparatuses that is connected in the series through the single communication line and an information element based on changes of the voltage value of the voltage transfer signal, and said current determination unit, that is configured not to be affected by the voltage transfer signal, and configured to receive, through the single communication line, the voltage transfer signal that is transmitted from the other of the two adjacent secondary battery protection apparatuses that is connected in the series through the single communication line and an information element based on changes of the current value of the current transfer signal, and wherein each of the two adjacent secondary battery protection apparatuses has a transmission/reception terminal that is directly connected to each other.

2. The secondary battery protection apparatus according to claim 1, wherein the one of the two adjacent secondary battery protection apparatuses is powered by the secondary battery cells that are connected in parallel.

3. The secondary battery protection apparatus according to claim 1, wherein the current transmission unit includes one or more constant current supplies, and the current transfer signal is generated by turning on/off the constant current supplies.

4. The secondary battery protection apparatus according to claim 1, wherein the voltage transmission unit includes one or more constant voltage circuits, and the voltage transfer signal is generated by controlling the constant voltage circuits.

5. The secondary battery protection apparatus according to claim 4, wherein each of the constant voltage circuits includes one or more diodes, and a constant voltage is generated based on the forward voltage of the one or more diodes.

6. The secondary battery protection apparatus according to claim 1, further comprising a control unit configured to output a control signal for switching between a charge operation and a discharge operation of a secondary battery cell that is connected in parallel based on one of determination results of the current determination unit and the voltage determination unit, and the control unit being further configured to perform recovery from a charge protection state or a discharge protection state of the secondary battery cell that is connected in parallel to a normal state based on the other of the determination results of the current determination unit and the voltage determination unit.

7. The battery protection apparatus according to claim 6, wherein the transmission/reception terminal is used for outputting the control signal and also used for transmitting the current transfer signal transmitted from one of the two adjacent secondary battery protection apparatuses and receiving the voltage transfer signal transmitted from the other of the two adjacent secondary battery protection apparatuses.

8. The secondary battery protection apparatus according to claim 7, further comprising a switch configured to cause the transmission/reception terminal to switch between a first state and a second state of the transmission/reception terminal, wherein the transmission/reception terminal outputs the control signal in the first state while the transmission/reception terminal transmits the current transfer signal transmitted from one of the two adjacent secondary battery protection apparatuses and receives the voltage transfer signal transmitted from the other of the two adjacent secondary battery protection apparatuses in the second state.

9. The secondary battery protection apparatus according to claim 1, wherein the first condition is met upon one of abnormalities of overcharge, over discharge and overcurrent with respect to the secondary battery cells being detected.

10. The secondary battery protection apparatus according to claim 1, wherein the second condition is met upon any of connection of a load to the secondary battery cells, disconnection of the load and disconnection of a battery charger being detected.

* * * * *